METHOD FOR IDENTIFICATION OF RANDOM SIGNAL PULSES

Filed Oct. 15, 1965 Sheet 2 of 3

United States Patent Office 3,444,519
Patented May 13, 1969

3,444,519
METHOD FOR IDENTIFICATION OF RANDOM SIGNAL PULSES
Rudolf O. Lütgenau, Munich, Germany, assignor to Siemens Aktiengesellschaft, Munich, Germany
Filed Oct. 15, 1965, Ser. No. 496,430
Claims priority, application Germany, Oct. 21, 1964, S 93,809
Int. Cl. H04q *1/00*
U.S. Cl. 340—147 9 Claims

ABSTRACT OF THE DISCLOSURE

A system for central registration of signal pulses, such as rate pulses in telephone installations, which arrive in random fashion on a plurality of signal lines. The pulses on each line are temporarily stored in bistable storage elements which are cyclically scanned by plural pulses. The result of scanning with the first pulse is ignored and only the output from the storage element responsive to the second pulse is evaluated.

GENERAL DESCRIPTION

This invention relates to the identification of signal pulses which arrive on signal lines at random intervals, but with a certain minimum time separation and having a certain minimum pulse length. For instance, the method of the invention is applicable to identification of charge-informing pulses for telephone installations.

It is already known that identification of such pulses can be carried out by continuous scanning of the individual signal lines in cyclic manner. This scanning operation generally employs coincidence gates (for example, diode gates) which are successively activated. If it be assumed that the repeated scanning of each coincidence gate to activate it takes place in rapid enough fashion, the outputs of the coincidence gates will exhibit the immediate signal condition of the signal line supervised by the respective gate. However, this result is only possible if all signal lines are scanned during the duration of the shortest signal pulse.

In order to eliminate the possibility of the same signal pulse being counted a plurality of times, when all lines must be scanned during the duration of a single signal pulse, the actual registration criterium, or condition for recordation of a signal pulse, is determined in accordance with the so-called "last look" principle. By such principle, each result of an interrogation of a gate is temporarily registered for the duration of an interrogation cycle, in a register element which is assigned to the respective line, and this registered result is compared with the following interrogation result for that respective line. Since the transition from a no-signal condition to a signal condition, as well as the transition from the signal condition into the no-signal condition, is characteristic of a signal pulse, the registration of a signal pulse occurs in accordance with this comparison system only upon identification of a transition from one to the other direction.

In such a system the scanning results of two successive scanning cycles are therefore required. Moreover, in order that the two possible signal conditions (signal or no-signal) on the signal lines to be supervised can be determined with accuracy, the repetition period or scanning period for the scanning pulses must neither be greater than the duration of the shortest single pulse to be determined, no greater than the duration of the shortest interval between pulses. The most favorable scanning condition therefore results from a pulse to interval ratio of 1:1.

It is also known that signal pulses of certain length (for example, those pulses identifying dialing digits), can be distinguished from pulses of either shorter or longer duration (for example, in the form of short noise pulses, or alternatively in the form of signals indicating release of a connection in telephone installations), so that a signal pulse which is to be registered can be determined from the interrogation results of at least three successive scanning cycles. Minimum expenditure for equipment in this case occurs when the pulse interval or scanning period of the scanning pulses is slightly smaller than one-half of the duration of the signal pulse of the minimum length, so that at least two scanning pulses coincide with the same signal pulse. With such a system each signal pulse can be recognized by either the succession of outputs of the diode gates as "0–1–1" or "1–1–0." In contrast, signal pulses which are shorter than the time interval between the two successive scanning pulses are eliminated by this system, since they can result only in the succession "0–0–1" or "0–1–0," or "1–0–0." Of course, instead of three scanning cycles, a larger number of cycles can be employed for determination of a single pulse of a particular length. In such case, for each additional scanning cycle a further register element is required.

In addition, it has been suggested that interrogation processes operating in accordance with the "last look" principle can employ bistable interrogation elements which are themselves used as gates, instead of using separate coincidence gates (for example, ferromagnetic ring cores can be used for such interrogation gates). By reason of the resister qualities of such ring cores, each inquiry pulse, or interrogation pulse, is able to switch the register elements to be interrogated into the initial or idle condition, even when a signal pulse is simultaneously present. However, additional measures are required in order that scanning conditions equally favorable to those found in the case of utilization of the more expensive diode gates can be achieved for the less expensive ring core gates. As a result of their register characteristics, such bistable register elements as ring cores do not return by themselves into the idle condition upon disappearance of the signal pulse. The return to such idle condition, in addition, is caused only by the first inquiry pulse which coincides with the actual interval between two signal pulses, so that, in response to the inquiry, a "1" is supplied, instead of a "0." In such case only the second inquiry or interrogation pulse which coincides with the interval between signal pulses, supplies the result "0" which identifies the idle condition. Therefore, in order to be able to determine with certainty when an interval between two successive signal pulses is occurring, the pulse repetition time of the scanning pulses must not be greater than the duration of half of the shortest interval between signal pulses. However, scanning conditions similar to those met when diode gates or the like are employed, can be achieved when the scanning pulses are formed as double pulses, and the interrogation results of each of the two single pulses of such a double interrogation pulse are evaluated.

The same principle is applicable in the elimination of shorter noise pulses, in which case, however, an additional register element must be employed. This is true in the case of application of the most favorable inquiry or interrogation conditions in accordance with a "last look" which extends over two inquiry cycles, since the recognition of a signal pulse with certainty is possible only when the result successions are "0–1–1–1" or "1–1–1–0."

The present invention employs a further development from the previously mentioned process, for identification of signal pulses which arrive on signal lines in random succession, but with a certain minimum time interval between such pulses and with the pulses themselves having a certain minimum length. The method of the invention employs bistable interrogation elements which are directly usable as gates and which are individually assigned to the signal lines, for example, ferromagnetic ring cores. The invention causes these bistable gates to be scanned successively in cyclic fashion by interrogation pulses, each consisting of two pulses of like polarity which immediately follow each other at short intervals, and each of which pulses is capable of switching the bistable interrogation element to be scanned into the rest or idle condition, even though a signal pulse may be simultaneously present at that bistable element. Furthermore, in a method according to the invention, the results of the interrogation achieved through use of the double pulses, together with the results obtained in the previous interrogation cycle, are employed to control a connecting link which evaluates these results and which is formed of logical components. This evaluating connection link operates in accordance with the known "last look" principle to compare the previous interrogation result with the instantaneous interrogation result, and to cause the registration of the individual signal pulses, in appropriate circumstances.

It is an object of the invention to decrease the cost of the known processes of identification of random signal pulses, by use of bistable inquiry elements which are directly usable as gates, in place of the more costly diode gates. It is still a further object of the invention to achieve the same favorable scanning conditions as obtained by use of diode gates, with like evaluation logic. This result is achieved by reason of the fact that the first of the two pulses which form on double inquiry pulse is not evaluated, and that the registration of a signal pulse takes place only when a result succession determined by the second pulse of the double interrogation pulse makes possible the recognition of a signal pulse to be registered, this being done analogously to the known interrogation conditions maintained upon scanning of gates not having registration qualities.

By reason of the similarity between the individual pulses forming the double interrogation pulse, each first-occurring pulse acts like a "cleaning" pulse preceding the actual interrogation pulse and insures that the continuation of a signal pulse which is caused only by reason of the registration characteristics of the interrogation elements, cannot cause reaction with the immediately following interrogation pulse. The result is that the signal pulse stored in the inquiry element is canceled in simple fashion, so that the inquiry or interrogation result which is achieved through use of the second of the double pulses gives the instantaneous signal condition of the supervised signal line, in the same fashion as in scanning over diode gates, or the like. As a result, the interrogation conditions to be maintained are the same as in the case of the use of the ordinary "last look" process. This is also true in the requirement for register elements for temporary registration of preceding inquiry results, in particular when short duration pulses, such as noise pulses, are to be eliminated.

A particular advantage of the process of the present invention, as compared to known processes employing diode gates, results from the possibility of elimination of distortion or noise pulses to a far greater extent than possible in connection with the use of diode gates. This can be achieved through slight additional modifications or conditions applied to the process. Thus, for example, the improper effect upon meter results by reason of chattering of signal-emitting contacts, can be avoided with the method of the invention in a quite simple manner. This is achieved by insuring that the interval between the two single impulses forming the double inquiry pulse is larger than the largest possible chattering gap. The maintenance of this time condition has the consequence that the uniform inquiry or interrogation result indicating the presence of a signal pulse is achieved even during chattering times of the signal pulse, by reason of the registration quality of the interrogation elements.

Furthermore, with the process of the invention, in similar fashion to a previously suggested process, it is possible to lessen the probability that a negative noise pulse can split a signal pulse into two partial pulses and thereby cause an erroneous count. This may be achieved by splitting the second of the single pulses forming the double inquiry pulse, which second pulse is used to supply the interrogation result, into a double pulse iself, so that there are really three pulses contained within a single inquiry or interrogation pulse. Then, if the second and third pulses are valued together as if they were a single pulse, all of the successions "0–1," "1–1" and "1–0" may be evaluated as an interrogation result "1," but the result succession "0–0" may be evaluated as the result "0." In this fashion, the danger that a single interrogation pulse may coincide with the distorting noise pulse is considerably decreased, so that the possibility that the interrogation result may be incorrectly reported as a "1" instead of a "0" is correspondingly considerably decreased. Moreover, the distorting pulses which are shorter than the time interval between the single pulses which provide an interrogation result remain without effect, since only one of the double interrogation pulses can coincide with such a distorting noise pulse. Since such distorting pulses are generally only of very short durtion, error-free counting of the signal pulses arriving on the individual signal lines is thus possible in simple fashion by proper selection of the time interval between the two single pulses which supply the interrogation result.

The number of registration elements for the temporary storage of the inquiry results necessary for determination of a registration criterion is not increased by means of this particular protection measure, if the two inquiry results appearing as a result of each scanning operation are conveyed to a buffer storage element before evaluation.

DETAIL DESCRIPTION

Further details of the invention will now be described in conjunction with the showing of an operative embodiment of the invention in the accompanying drawings. In the drawings.

Figure 1:
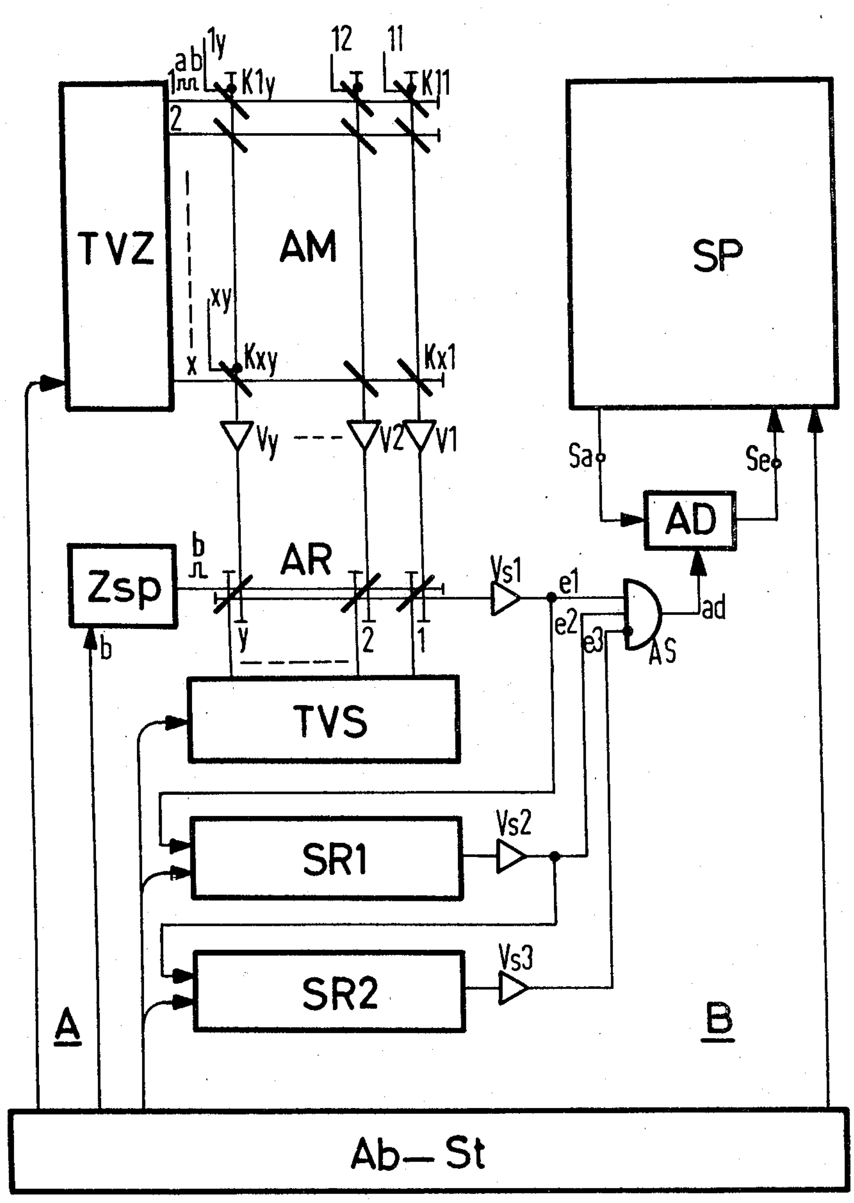
FIG. 1 is a block diagram of a circuit arrangement operable to carry out the process of the invention.

The apparatus of FIG. 1 is divided into two separate parts indicated by the letters A and B, toward the lower end of the figure. These two parts are linked together by the evaluating switching device AS, shown as a logical AND, and the central program control apparatus *Ab-St*. The specific circuit arrangement of the registration systems, as well as of the scanning and adding systems, to be described generally hereinafter, is not at all important to the present invention. Rather, any appropriate registration and scanning systems may be used in conjunction with the invention, as will be apparent.

The apparatus identified at A serves for classification into a time multiplex system of signal pulses arriving randomly on signal lines 11 to *xy*, of a local multiplex system. For this classification purpose, each signal line is provided with a bistable storage element shown schematically at K11 to *Kxy*, formed together in a matrix shown at AM. Each of the bistable storage elements may be a magnetic ring core of well-known characteristics.

The cyclic interrogation of the individual storage elements takes place in accordance with known arrangements in such a way that each one of the storage elements along a single row (such as row 1) is interrogated at the same time, so that each one of the elements K11 to K1$y$ will be simultaneously interrogated. In this known system, the information contents contained in the interrogated elements are forwarded, in parallel, over the column lines 1-$y$ to the interrogation register AR. The interrogation of the elements assigned individually to the signal lines (for example, 11 to 1$y$, over row 1) is accomplished by the synchronizing distributor TVZ, controlled in step fashion from the central program control apparatus A$b$-S$t$.

The parallel information from the signal lines 1-$y$ can be converted into serial information by scanning of the register AR by a synchronizing distributor Z$sp$. This distributor, like the distributor TVZ, is controlled from the central program control apparatus A$b$-S$t$.

The part B of the apparatus of FIG. 1 is made up of the central registration and storage apparatus. The main register SP contains a number of individual registers corresponding to the number of signal lines to be supervised. These registration elements may be in the form of register spots on a magnetic drum, or in the form of a ring core row of the conventional type of ring core register, with each spot or each core individually assigned to a signal line. These individual registers serve for actual registration of the number of signal pulses arriving on the signal line to which each register is assigned. Registrations suitably may take place in an appropriate code, such as the tetrad code. The register capacity of the main register SP depends upon the maximum number of signal pulses to be registered.

The summing up of the signal pulses which arrive randomly for each signal line takes place through operation of the central adding apparatus AD. For this purpose, the information identifying the total number of the signal pulses so far accrued for each signal line, contained in the main register SP is continuously conveyed to the adding mechanism from the main regis-SP, and after any new pulses are added thereto, the result is conveyed back to the main register. This cycle, which may continuously repeat itself, is also synchronized by means of the central program control apparatus A$b$-S$t$, with the inquiry signal operating upon the part A of the apparatus. Such synchronization occurs in a fashion such that the information content of an interrogation element K . . . assigned to the particular signal line arrives for evaluation at the same time as each transfer of information to the addition apparatus AD, for that same line.

The decision as to whether an addition is to take place is furnished by the evaluating switching device or logic element AS, which connects the two parts A and B of the apparatus. This link is formed as a blocking gate which has one or more signal inputs $e$1 and $e$2, as well as a control input $e$3. The control input $e$3 is shown as an inverting input, and the gate AS responds to provide an output $ad$ to the adding apparatus AD only when a pulse ("1") is available on both signal lines $e$1 and $e$2, but not available on line $e$3. The temporary registration of interrogation results for the "last look" process, is obtained through use of shift registers SR1 and SR2 which are respectively connected with the output of the inquiry register AR, and the shift register SR1. The control of the shift registers SR1 and SR2 also occurs by operation of the central program control apparatus A$b$-S$t$ and this proceeds in such fashion that the results from the identical interrogation elements K are simultaneously present at the output of the interrogating register AR and the two shift registers SR1 and SR2. In other words, the shift registers provide a delay of one interrogation cycle, for supply of pulses to the blocking gate AS.

It should be evident that separate bit registers can be provided in main register SP, in place of the shift registers SR1 and SR2.

Figure 2:
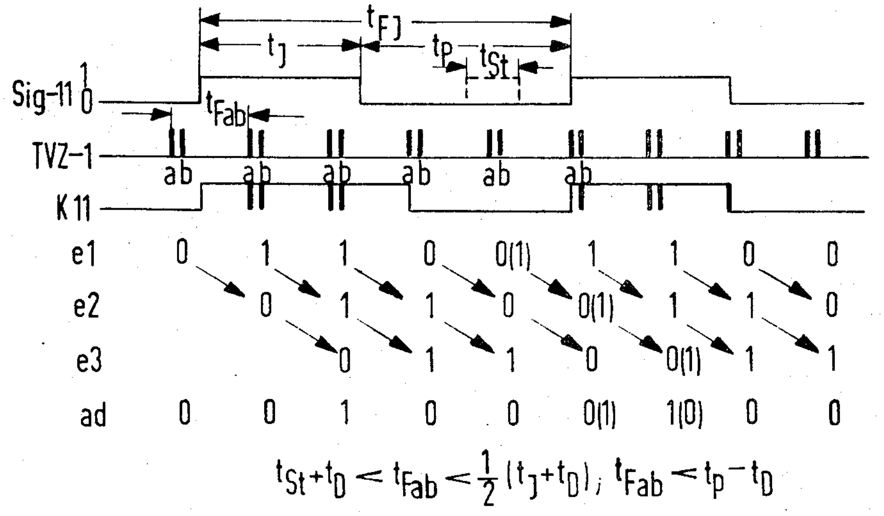
FIG. 2 is a diagram illustrating the pulse sequences and the possibilities occurring with the apparatus of FIG. 1.

Referring now to FIG. 2, that figure shows pulse sequences appropriate to the apparatus of FIG. 1. The uppermost curve labeled Sig–11 indicates the "0" and "1" conditions of the signal pulses assumed to be present on signal line 11 during the course of the period being examined by FIG. 2. Below the first graph is a second graph indicating the scanning pulses supplied over synchronizing distributor TVZ, with the first single scanning pulse of a double interrogation pulse indicated by the letter $a$, and the second single pulse indicated by the letter $b$. The pulse curve shown immediately below identifies the voltage levels on interrogation storage element K11, due to the combination of the signal voltages applied to it and the interrogation pulses applied to it.

It will be seen from FIG. 1 that only the second individual pulse of each double interrogation pulse is supplied to the register AR. The graphic showing identified at $e$1 indicates the direct output of this register to the evaluating switching device or logical AND AS, in binary fashion. Similarly, the showings labeled $e$2 and $e$3 correspond with these two additional inputs to the logic circuit. Finally, the last showing of FIG. 2 is that identified at $ad$, indicating the output of the logic circuit AS, to the addition device AD.

As indicated hereinabove, only the second of the two scanning interrogation pulses $a$ and $b$ causes an interrogation result $e$1. The first pulses $a$ serve as preliminary pulses for cancellation of the previously existing condition of the interrogation element. As a result, as long as both single pulses of the double interrogation pulse coincide with interval between two signal pulses, the interrogation result $e$1 is always at a "0." It is only when the second pulse $b$ coincides with a single signal pulse that the output $e$1 is a "1." In the following cycle, at the same identical time, the interrogation result at $e$2 is identical, while in the further following cycle at the same time the interrogation result is at $e$3, by reason of the shifts applied by the respective shift registers SR1 and SR2.

Under normal circumstances, the comparison of two successive interrogation results would suffice for determination of a registration demand $ad$, so that either the result succession "0–1" upon registration at the beginning of each signal pulse, or the result succession "1–0" upon registration at the end of each signal pulse, would result in a registration command. In such a system the most favorable scanning conditions exist when the interrogation cycle, as shown as $t_{Fab}$ is either equal to or less than the length of the signal pulse, shown as $t_J$, and the same cycle is also equal to or less than the time interval between signal pulses, shown as $t_P$.

However, if noise pulses imitating the signal pulses can be encountered, then substantial avoidance of improper multiple counting can be averted only when the determination of the registration criterion is dependent on the simultaneous presence of the inquiry or interrogation results of more than two scanning cycles. This necessitates that the impulse succession time of the scanning pulses, limited by the duration $t_J$ of the shortest signal pulse to be recognized, be correspondingly decreased. In general, the minimum requirements for the register elements needed and the most favorable scanning conditions for a system in which distorting noise pulses are to be expected, taking into account the duration $t_{St}$ of the longest noise distorting pulse to be expected, as compared with the duration of $t_J$ of the shortest signal pulse to be identified are:

$$n \geqq \frac{1}{1-\frac{t_{St}}{t_J}}; \; t_{Fab} = \frac{1}{n} \cdot t_J$$

These equalities indicate the number $n$ of register elements corresponding to $n+1$ interrogation results which are required to be used for determination of the registration criterion. Since the duration of the distorting pulses is generally short in comparison with the duration of the shortest signal pulse to be identified, usually the interrogation results of three successive scanning cycles, and the use of two register elements, are sufficient.

The operative embodiment of FIG. 1, and the pulse diagram according to FIG. 2 correspond to these equations. As a result, a registration occurs only upon pressence of the result succession "0–1–1." Consequently, distorting pulses which are shorter than one-half of the length of the signal pulse are certainly eliminated, since only one inquiry pulse can coincide with the distorting pulse so that the result succession "1–1" cannot be caused by a distorting pulse. In this case it does not matter whether the time interval between the distorting pulse and the preceding (or the succeeding) signal pulse is larger (or smaller) than the time interval between two successive signal pulses. In the latter case, the distorting pulse would only cause increase in the length of the preceding, or the following signal pulse, if by chance no interrogation pulse should coincide with the existing gap. The pulse diagram of FIG. 2 takes this case into consideration. The distorting pulse is indicated in dotted lines in the signal diagram, in the interval between information pulses. The change in the inquiry result caused by this distorting pulse is shown in parentheses. Since the interrogation pulse following the distorting pulse already corresponds with the succeeding signal pulse, the registration as a signal pulse merely takes place one scanning cycle earlier. However, multiple counting of a single information pulse is not caused to occur.

Figure 3:
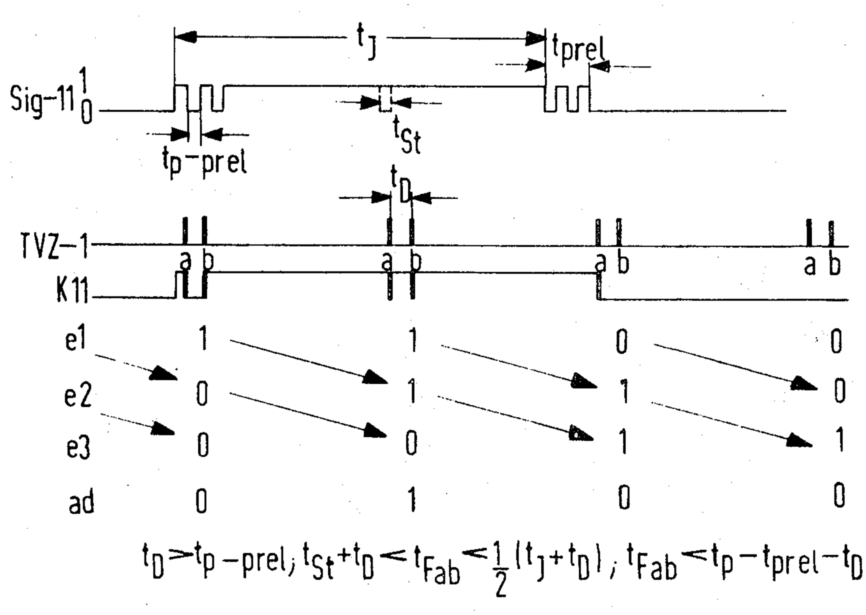
FIG. 3 is a pulse diagram of the same type as FIG. 2, but illustrating chattering pulses and their effects.

The impulse diagram of FIG. 3 is similar to that of FIG. 2, but shows the effect of contact chatter. Contact chatter at the beginning of a signal pulse of course causes an interruption of the signal pulse and the consequent shortening thereof. This fact naturally must be considered in application of the simple "last look" principle, if evaluation is to extend over only two scanning cycles, to avoid erroneous counting. That is, if, for instance, the impulse repetition period of the scanning pulses is selected as equal to the pulse time $t_J$ of the signal pulse, undiminished by the chatter, then there is the possibility that the first of two successive interrogation pulses will coincide with a chatter gap at the beginning of the signal pulse and the second interrogation pulse will coincide with the next interval between signal pulses. The result would be that the signal pulse would not be counted. On the other hand, if the pulse repetition period of the scanning pulses is smaller than the chatter time $t_{prel}$ during which the signal pulse is distorted by the chatter, there is danger that successive interrogation pulses may coincide alternately with a chatter pulse, or else with the true signal pulse and a chatter interval. In such case a single signal pulse may be counted several times.

These erroneous counts caused by chattering, however, can be avoided in simple fashion when the time interval $t_D$ between the single pulse $a$ and $b$ which form the double interrogation pulse, is at least as long as the duration $t_{P-prel}$ of the largest possible gap caused by chatter. This is for the reason that it is made sure that the interrogation element is once more in registration position by the time of the actual interrogation pulse $b$, in the case of coincidence of the preliminary interrogation pulse $a$ with a chatter pulse, and the result is that a "1" is supplied as an interrogation result, independently of whether the single pulse $b$ coincides with either a chatter gap or a chatter pulse. Thus, the effects of chatter pulses at the beginning or at the end of the signal pulse can be completely suppressed, by the utilization of the registration quality of the inquiry elements, which is otherwise diadvantageous. If this mentioned time condition is achieved, uniform inquiry results are obtained, independently of the phase position of the individual inquiry pulses with respect to the signal pulse which is to be tested, during the entire duration of the signal pulse including the prolonging chatter time $t_{prel}$ at the end of the signal pulse. Furthermore, the time conditions already mentioned in describing the pulse diagram of FIG. 2 are applicable to this condition with chatter pulses, with but one exception. That exception is that the interval time $t_P$ which codetermines the pulse succession time of the scanning pulses must be shortened by the maximum chatter time $t_{prel}$ appearing at the end of a signal pulse.

Figure 4:
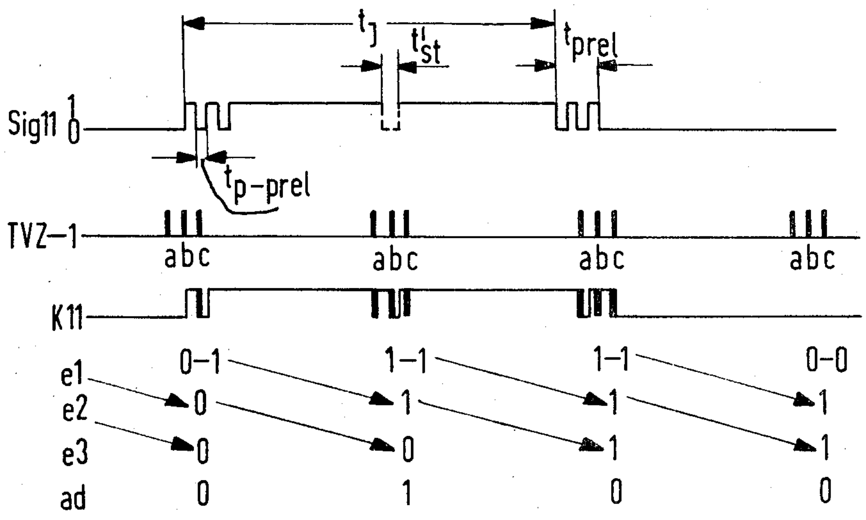
FIG. 4 is a further pulse diagram of the type of FIG. 2, showing the use of triple scanning pulses.

FIG. 4 shows a similar impulse diagram as compared with FIGS. 2 and 3, but for the use or triple interrogation pulses, in order to be able to suppress the negative distortion pulses which split signal pulses which are to be identified.

In contrast to the previously-described processes using interrogation pulses of double pulse form, the process indicated by FIG. 3 employs three signal pulses $a$, $b$ and $c$, with the pulse $a$ effective only as a preliminary pulse, while the following signal pulses $b$ and $c$ give rise to two evaluating results. With this system, an advantage now to be described is realized. If, for example, a signal pulse to be identified is split by a distorting pulse of the duration $t_{St}$ into two single pulses, then, if only a double interrogation pulse were used, there would result the danger that the single pulse $b$ which provides the interrogation result, would coincide with the distorting pulse and indicate an interval between pulses. If the scanning interval between interrogation pulses were too short, this could lead to multiple counting of the same signal pulse.

Through doubling of the scanning pulses $b$ and $c$, this danger is considerably decreased. In particular, all distorting pulses which are shorter than the time interval between two single interrogation pulses $b$ and $c$ are without effect. The time interval between the three single pulses $a$, $b$ and $c$ can be selected arbitrarily. If, in addition, chattering might appear, then the time interval may not be smaller than the greatest possible chatter gap $t_{P-prel}$ to be expected, however.

In the system of FIG. 4 the interrogation results obtained through use of both of the pulses $b$ and $c$ are evaluated as a single result, in such fashion that the result successions "0–1," "1–1" and "1–0" are each evaluated as a "1," while the result succession "0–0" is evaluated as "0." Thereby it is not necessary that the interrogation register AR of FIG. 1 be changed, since the register elements connected with the individual row lines 1-$y$ of the evaluation matrix AM are flipped into registration condition, anyway, with each "1." Moreover, the scanning conditions which have been mentioned above in connection with description of the other processes, are applicable to the process of FIG. 4. Of course the switching times of the interrogation elements are not taken into consideration, thereby. Their effect can be of consequence in certain cases, but in general they may be disregarded.

In closing, it should be mentioned that as the scanning pulses are increased in length, the number of signal lines which can be supervised during a certain interval of time necessarily correspondingly decreases. This effect can be circumvented if, instead of a single inquiry register such as shown at AR in FIG. 2, two registers are provided, and the inquiry or interrogation results obtained by scanning of the single rows of inquiry elements K . . . are conveyed alternately to these two inquiry registers. In such case the registers would be scanned successively, so that the input into one would take place during the interrogation scanning of the other.

Otherwise it is unimportant to the invention whether the scanning and the registration processes operate continuously or are started only upon request by the first incoming signal pulse and stopped again when no further signal pulse is present. The same is true for the manner of registration. While in the arrangement of FIG. 1, registration is carried out in such fahion that the arriving signal pulses are added up in an individual register which is permanently assigned to the corresponding signal line, it is also possible in accordance with another known process to record the meter status of the scanning apparatus TVZ and TVS, instead of a signal pulse, upon there being present at the output $ad$ of the elevating connection link S a registration command. The meter reading, which would thus arrive in random succession and would represent a signal pulse, must however be arranged and added up afterwards. Moreover, in the case of long distance lines having connection arrangements inserted between such as relay sets in the first group selection stage, it is possible to scan the connection arrangements forming a cord station directly connected ahead of the long distance lines, over inquiry elements individually assigned thereto, instead of scanning the individual long distance lines. In application to this already known processes, the registration commands at the output *ad* of the evaluating connecting link AS would travel by way of the detour to the number still to be determined or already determined of the long distance lines, and this in such fashion that each registration command would at first release identification of the connected long distance lines, or release for registration the individually registered, already present, long distance line number. In this case also, the line number which is present can be directly recorded, instead of recording a single pulse, or that line number can be employed for the control of an addition register individual to the line.

Many other minor changes could be made in the method of the invention without departure from the scope thereof. Accordingly, the invention is not to be considered limited to the preferred embodiments describd herein, but rather only by the scope of the appended claims.

I claim:

1. In a system for the registration of signal pulses arriving on a plurality of signal lines in random succession, but with a certain minimum time interval between signal pulses and with the pulses having a certain minimum length, such as rate pulses in telephone installations; bistable storage elements such as ferromagnetic ring cores individually assigned to the signal lines for temporary storage of signal pulses arriving on the respective lines; means for cyclically scanning the storage elements by at least two successive pulses of the same polarity following each other in quick succession in each scanning cycle, each of the scanning pulses being operable to switch the storage element, even in the simultaneous presence of a signal pulse, into its initial condition, whereupon the storage element develops an output pulse; means for evaluating the scanning operation of the storage elements by comparing output pulses from the storage elements in successive scanning cycles; and means for registering the individual signal pulses under control by said evaluating means; the improvement comprising:

means connected between the storage elements and said evaluating means responsive only to storage element output pulses caused by scanning pulses subsequent to the first pulse, in each scanning cycle.

2. In a process for the registration of signal pulses arriving on a plurality of signal lines in random succession, but with a certain minimum time interval between signal pulses and with the pulses having a certain minimum length, temporarily storing the signal pulses in bistable storage elements individually assigned to and receiving pulses from the signal lines, scanning the storage elements successively in cyclic fashion by closely-spaced plural interrogation pulses, each single pulse of said plural pulses being operable to switch the storage element into an initial condition, even if a signal pulse is then stored by the storage element, to cause the element to deliver an output pulse; evaluating the output pulses from the storage elements resultant from one scanning cycle together with the output pulses obtained in at least one previous scanning cycle; and registering the individual signal pulses under control by said evaluating step; in which the improvement comprises:

rejecting the output pulses from the storage elements coincident with the first pulses of each plural pulse and evaluating in said evaluating step only the output pulses coincident with any pulse subsequent to the first pulse in each interrogation cycle.

3. The method of claim 2 in which the interrogation period or time spacing between corresponding interrogation pulses ($t_{Fab}$) is no greater than the minimum length of the signal pulses to be expected ($t_J$) and no greater than the minimum interval ($t_P$) between signal pulses to be expected.

4. The method of claim 3 in which the result of each interrogation puse is stored in successive cycles in $n$ storage elements, for comparison of the result of $n+1$ interrogation cycles in said evaluating step and the said time spacing ($t_{Fab}$) between corresponding interrogation pulses is approximately equal to the minimum length of the signal pulses ($t_J$) to be expected divided by the said $n$ number.

5. The method of claim 4 in which distorting pulses of certain maximum length ($t_{St}$) must be expected on the signal lines and in which the interrogation period ($t_{Fab}$) is greater than the sum of said maximum distortion pulse length ($t_{St}$) and the time spacing between single pulses of a double interrogation pulse ($t_D$).

6. The method of claim 5 in which said interrogation period ($t_{Fab}$) is less than the sum of said minimum signal pulse length ($t_J$) and said maximum distortion pulse length ($t_{St}$), divided by the number $n$.

7. The method of claim 2 in which the signal pulses are distorted by chattering of signal-emitting contacts, and chracterized by the time interval ($t_D$) between the two pulses of a double interrogation pulse sequence (*a* and *b*) being longer than the longest possible chatter gap ($t_{P-prel}$).

8. The method of claim 7 in which the second of the double pulses forming the interrogation double pulse is in turn split into a double pulse, and the interrogation results from the so-split pulse are combined to determine whether a signal should be registered.

9. The method of claim 8 in which the bistable interrogation elements provide one detachable condition ("1") when a signal pulse and the second or the third interrogation pulse of a pulse sequence are simultaneously present, and another detectable condition ("0") when no signal pulse is present during the time that the second or the third interrogation pulses are supplied thereto, and wherein a signal pulse is registered by the process when the bistable element remains in said one condition or changes from one of the two conditions to the other, but no signal pulse is registered when the bistable element remains in said other condition, between the second and third interrogation pulses of a pulse sequence.

References Cited

UNITED STATES PATENTS

| | | | |
|---|---|---|---|
| 3,342,940 | 9/1967 | Gattner et al. | 179—7.1 |
| 3,342,939 | 9/1967 | Gattner et al. | 179—7.1 |

DONALD J. YUSKO, *Primary Examiner.*

U.S. Cl. X.R.

179—7